US009061631B2

(12) United States Patent
Totzauer

(10) Patent No.: US 9,061,631 B2
(45) Date of Patent: Jun. 23, 2015

(54) METHOD AND SYSTEM FOR COMPENSATING FOR MISALIGNMENT OF A HEADLIGHT

(71) Applicant: Audi AG, Ingolstadt (DE)

(72) Inventor: Alexander Totzauer, Groebenzell (DE)

(73) Assignee: AUDI AG, Ingolstadt (DE)

( * ) Notice: Subject to any disclaimer, the term of this patent is extended or adjusted under 35 U.S.C. 154(b) by 186 days.

(21) Appl. No.: 13/867,603

(22) Filed: Apr. 22, 2013

(65) Prior Publication Data

US 2013/0279185 A1 Oct. 24, 2013

(30) Foreign Application Priority Data

Apr. 23, 2012 (DE) .......................... 10 2012 007 908

(51) Int. Cl.
 *B60Q 1/04* (2006.01)
 *B60Q 1/10* (2006.01)
(52) U.S. Cl.
 CPC .. *B60Q 1/04* (2013.01); *B60Q 1/10* (2013.01); *B60Q 2200/38* (2013.01)
(58) Field of Classification Search
 USPC .......................... 362/460, 462, 464, 465, 466
 See application file for complete search history.

(56) References Cited

U.S. PATENT DOCUMENTS

| 6,373,378 | B1 | 4/2002 | Ewerhart | |
|---|---|---|---|---|
| 7,124,008 | B2* | 10/2006 | Brun et al. | ........................ 701/49 |
| 2002/0075691 | A1* | 6/2002 | Couillaud et al. | ............. 362/465 |
| 2003/0001509 | A1* | 1/2003 | Leleve | ............................. 315/77 |
| 2008/0298077 | A1 | 12/2008 | Naganawa | |
| 2010/0060487 | A1 | 3/2010 | Augst | |
| 2010/0188864 | A1* | 7/2010 | Raghunathan et al. | ........ 362/466 |
| 2011/0116277 | A1* | 5/2011 | Niemz | ........................... 362/464 |

FOREIGN PATENT DOCUMENTS

| CN | 1235913 A | 11/1999 |
|---|---|---|
| CN | 1495066 A | 5/2004 |
| DE | 102008011699 | 9/2008 |
| DE | 102007022524 | 11/2008 |
| DE | 102007049619 | 4/2009 |
| DE | 102010046517 | 4/2011 |
| DE | 102010006190 | 8/2011 |

OTHER PUBLICATIONS

Chinese Search Report with respect to counterpart Chinese patent application 201310139699.5.

* cited by examiner

*Primary Examiner* — Laura Tso
(74) *Attorney, Agent, or Firm* — Henry M. Feiereisen LLC

(57) ABSTRACT

A method for compensating for misalignment of a vehicle headlight generating different beam patterns includes generating a light marking on an object outside the vehicle. The light marking is generated in a region that is located in front of, next to or behind the vehicle between a visibility limit of a camera and a visibility limit of a driver. Images of the light marking and an image of a surrounding area are recorded with a camera. A target illumination related to an image of the surrounding area is determined by taking into consideration illumination rules, and a light-marking-related target illumination is determined by taking into consideration the determined target illumination related to the image of the surrounding area and the recorded image of the light marking. The beam pattern of the headlight is then adjusted by taking into consideration the light-marking-related target illumination.

9 Claims, 2 Drawing Sheets

METHOD AND SYSTEM FOR COMPENSATING FOR MISALIGNMENT OF A HEADLIGHT

CROSS-REFERENCES TO RELATED APPLICATIONS

This application claims the priority of German Patent Application, Serial No. 10 2012 007 908.7, filed Apr. 23, 2012, pursuant to 35 U.S.C. 119(a)-(d), the content of which is incorporated herein by reference in its entirety as if fully set forth herein.

BACKGROUND OF THE INVENTION

The present invention relates to a method for compensating for misalignment of a headlight for a vehicle which is capable of generating light with different beam patterns. The invention also relates a corresponding headlight system.

It would be desirable and advantageous to obviate prior art shortcomings and to provide an improved light element reduces the illumination errors when the headlight can only be adjusted discontinuously and/or when the adjustment mechanism has tolerances. It would also desirable be to provide a headlight system with these advantageous features.

SUMMARY OF THE INVENTION

According to one aspect of the present invention, a method for compensating for misalignment of a headlight for a vehicle is provided, wherein the headlight is configured to generate light with different beam patterns, wherein the method includes the following steps: generating with the headlight a light marking on an object located outside the vehicle, wherein the light marking is generated in front, next to or behind the vehicle in an area that is located spatially between a visibility limit of the camera and a visibility limit of a driver; recording an image of the light marking with a camera; recording an image of the surrounding area with the same camera; determining a target illumination related to the image of the surrounding area by taking into account illumination rules; determining a light-marking-related target illumination by taking into account the determined target illumination related to the image of the surrounding area and the recorded image of the light marking; and adjusting a beam pattern of the headlight by taking into account the target illumination related to the image of the surrounding area.

According to another aspect of the invention, the headlight system for a motor vehicle is further configured to carry out the inventive method.

Adaptive matrix LED lighting systems, also referred to as matrix-beam systems, have been developed over the past years for flexibly adjusting the beam patterns of the headlight. Optimum illumination of the traffic situation can be provided to the driver with these lighting systems under different traffic and weather conditions by determining a target illumination related to the image of the surrounding area while taking into account illumination rules. When employing matrix-beam systems, the high beam can be permanently used for travel in darkness, wherein only areas where other road users are present are dimmed. Dimming is achieved without a mechanism via a freely programmable LED matrix. However, the careful adaptation of the light to the respective traffic and weather situation requires particularly accurate and reliable light adjustment.

By determining a light-marking-related target illumination while taking into account the determined target illumination related to an image of the surrounding area and the captured image of the light marking and by adjusting a beam pattern of the headlight by taking into account the light-marking-related target illumination, misalignment (if they are not too large) can then no longer affect the illumination of the surrounding area by the headlight, when the misalignment of the headlight alone is not eliminated. Compared with the conventional method, the inventive method has the advantage that the discontinuous adjustability of the headlight and/or the tolerances in the adjustment mechanism has no longer an effect, or at least has a lesser affect on the illumination accuracy. A motorized adjustment of the headlight to remove a small misalignment can be eliminated. Weight and manufacturing cost of the headlight system can thus be reduced. Electronic adjustability of the headlight for separate removal of a small misalignment can also be dispensed of. This simplifies complexity and thus reduces expenses for development, testing and maintenance of the headlight system.

According to an advantageous feature of the present invention, the image of the light marking may be recorded before and/or after the image of the surrounding area is recorded. In general, it may be more advantageous to record the light marking image before the image of the surrounding area. For example, recorded light marking images may then be used for several subsequent current images of the surrounding area.

According to another advantageous feature of the present invention, the image of the light marking may be recorded simultaneously with the recording of the image of the surrounding area. The recorded light marking images then become more current.

According to another advantageous feature of the present invention, the light marking may be generated predominantly with light having a wavelength between 380 nm and 780 nm. The spectral recording capability of the camera for recording images of the light marking then remains unchanged. To enable cameras to operate reliably even in bright daylight, the camera optics typically includes an infrared filter, which precludes detection of an infrared light marking.

Advantageously, the light marking may be generated in a frequency range, with a modulation frequency and/or with an amplitude which renders the light imperceptible to the human eye. This prevents distraction and/or irritation of the driver and/or other road users which can endanger the traffic. When the light marking is imperceptible to the human eye, it may also be generated on such objects that are located in a main illumination direction, that have a sufficient light reflectivity and that are located not too far away from the headlight. This prevents light for the light marking from being radiated in a direction where it is of no benefit to the driver. This feature can thus contribute to increase the efficiency of the headlight system. In addition, the light marking is then more centered on those areas of the image that must be evaluated with a high resolution at high vehicle speed, thus reducing an offset error between the image of the recorded image marking and the recorded image of the surrounding area and/or a parallax error in these important areas of the image.

According to another advantageous feature of the present invention, the light marking may have an angled shape and/or an L-shape. A low-cost aperture for generating the light marking can then be produced, enabling easy detection and evaluation of the light marking.

Advantageously, several images of the light marking may be used for generating the image of the light marking. For example, a synthetic light marking light marking image may be generated by superimposing several images, in which moving objects are imaged blurred, thereby simplifying and improving detection and evaluation of the synthetic light marking image.

According to another advantageous feature of the present invention, the light marking may be generated in front of, next to or behind the vehicle in a region that is located spatially between a visibility limit of the camera and a visibility limit of a driver. This avoids distraction and/or irritation of the driver by the light marking.

According to another advantageous feature of the present invention, the beam of the headlight may be adjusted by electronically and/or mechanically adjusting a light emission pattern of the headlight. A fast electronic adjustment of the emission pattern of the headlight is possible in particular by using a headlight with matrix LED technology.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
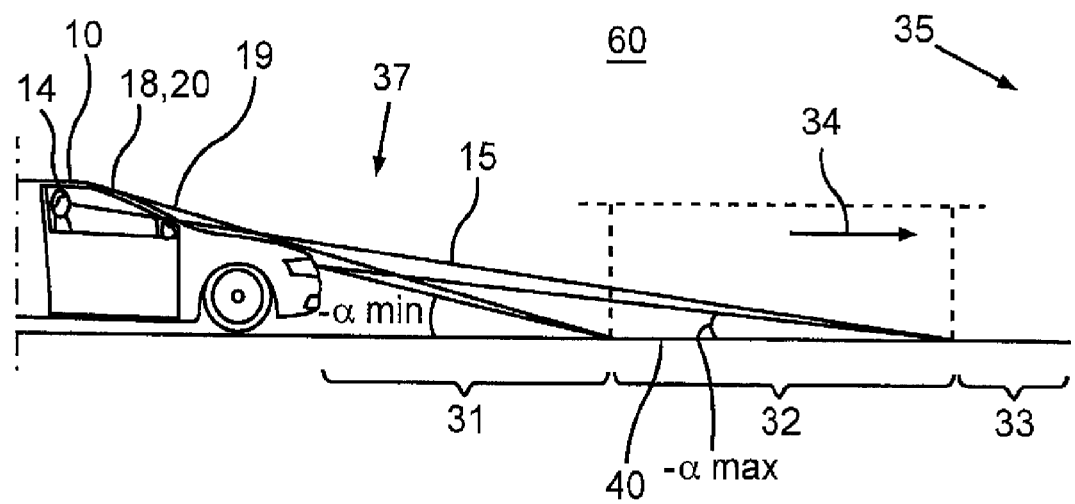
FIG. 1 shows a schematic side view for explaining an area that cannot be seen by a driver of normal size from his normal seated position without leaning forward, but that is visible from a vehicle camera.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
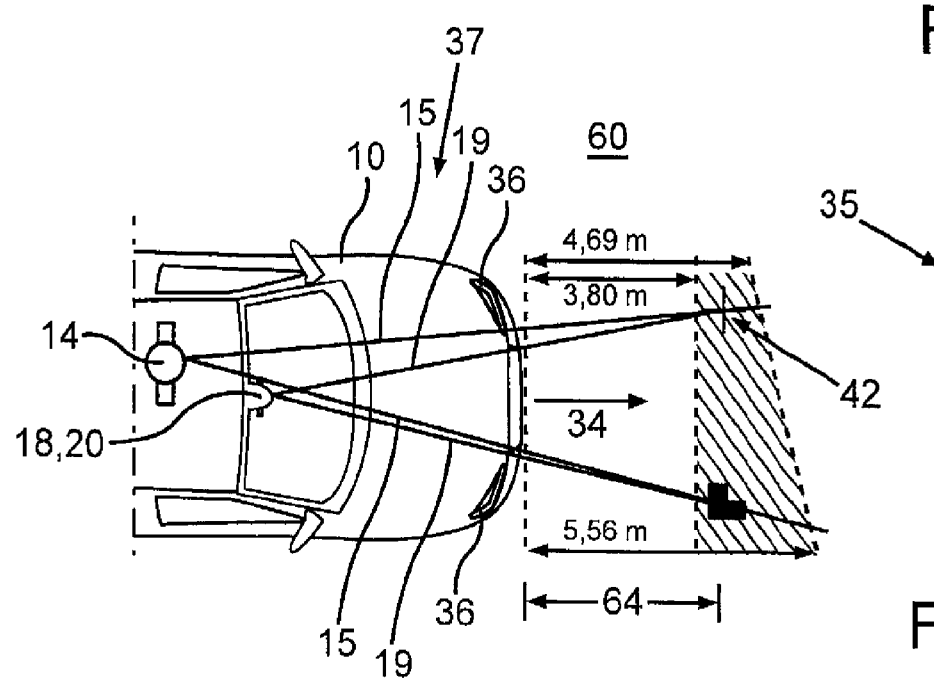
FIG. 2 shows a schematic plan view with two light markings of different shapes located in this area.

Turning now to the drawing, and in particular to FIGS. 1 and 2, there is shown a vehicle 10 having a lower visibility limit 15 of a driver 14 of normal height in a normal seating position and a lower visibility limit 19 of a camera 18 is arranged in an interior rear-view mirror 20 (preferably in a mirror base) of the vehicle 10. This clearly indicates that a first area 31 is located in front of the vehicle 10, which is visible neither for the driver 14 nor for the camera 18.

The camera 18 may be part of a high-beam assistant, which uses camera information and automatically and immediately changes from high-beam to low-beam when another road user appears in the beam direction 34. The high-beam assistant may also be configured to use camera information to immediately and automatically switch from low-beam to high-beam when another road user disappears in the beam direction 34. A continuous change between the high-beam and low-beam may be accomplished with a controllable roller. This process is known by the name of 'adaptive cut-off line' and 'moving illumination width'.

According to a still more advanced development known by the name 'glare-free continuous high-beam' and 'matrix beam', a high-beam distribution of a headlight 36 is fully customizable based on freely programmable LED arrays. This approach eliminates all mechanical parts in the headlight 36, allowing several road users identified by the vehicle camera 18 to be excluded individually from the illumination by the headlight 36. The matrix-beam method has proven successful especially on winding roads due to the very smooth adjustment of the light distribution. However, discrete light segments must be switched with the matrix-beam method, so that a noticeable gap in the light distribution is produced when a light segment is deactivated or an existing gap is noticeably enlarged. The utility of the system is enhanced commensurate with the accuracy of the light beam orientation by employing an adaptive lighting system, wherein individual parts of the high-beam are used even when another road user is located in the beam range of the headlight 36.

A second area 32 having a length between about 89 cm and 176 cm adjacent to the first region 31 can be viewed by the camera 18, but cannot be seen by the driver 14, provided that the driver does not lean forward. The lengths of the first 31 and second 32 region were identified in a test study with 15 men and 5 women who had a height between 1.65 m and 2.08 m with an average height of 1.83 m. The vehicle 10 used for the study was an Audi A8.

The angular range of $\alpha$min, $\alpha$max, in which the headlight 36 should project the light marking 38, is calculated according to the following formulas (1) and (2), wherein hSW is a height of the headlight above the roadway, dk is a horizontal distance of the visibility limit 19 of the camera 18 from the headlight 36, dFI is a horizontal left distance of the visibility limit 15 of the driver 14 from the left headlight 36, and dFR is a horizontal right distance of the visibility limit 15 of the driver 14 from the right headlight 36:

$$\alpha\text{min}=\arctan(dK/hSW)\square-10.4° \quad (1)$$

$$\alpha\text{max}=\arctan(\min(dFI,dFr)/hSW)\square-8.5° \quad (2)$$

Consequently, the light marking 38 should be arranged vertically in the angular range between −9° and −10°. A dynamic driving test, in which a cross pattern was projected, showed that a slight excess of the visibility limit 15 of the driver 14 is acceptable. Although the light marking 38 is then partly visible to the driver 14, it is generally not perceived when the driver 14 looks in the direction of the distant region 35. It therefore appears to be acceptable to base the visibility limit 15 on an average value of the visibility limits for drivers of different height.

A third region 33, which extends to the horizon and can be viewed by both the camera 18 and the driver 14 to the next intermediate object, abuts the second region 32.

The light for the light marking 38 can be generated outside or inside the headlight 36. Advantageously, a corresponding light marking 38 just in front of the vehicle 10 is projected onto the roadway 40 for each of the two headlights 36. A projection module is used for generating the light marking 38. According to one embodiment, the light emitted from the lighting device for generating the light marking is apertured by an aperture. Assuming that the second region 32, as viewed from an imaging lens, can already be assigned to an infinite distance ("is already at infinity"), the aperture should the arranged so as to produce a sharp image in the focal plane of the imaging lens facing away from the roadway 40. The term imaging lens refers herein to an optical system that may include one or more lenses and/or mirrors. To improve the sharpness of the light marking, aperture components whose image is located closer to the vehicle 10 than the image of other aperture components, may be disposed at a slightly greater distance from the imaging lens than the other aperture components, and vice versa. Advantageously, the aperture may be inclined relative to a principal plane of the imaging lens.

The optics of the multifunction camera 18 (which also provides information for other driver assistance functions) installed in the mirror base typically includes an infrared filter which allows the camera 18 to operate reliably also in bright daylight. For this reason, high-power LEDs producing white light suitable for detecting the light marking 38 with the vehicle camera 18 can advantageously be employed for generating the light marking 38. Moreover, irritation of the driver 14 and/or of other road users by the coloration of the light marking can be eliminated.

A particular challenge is the mechanical manufacture of the required apertures. An aperture with a very thin slit is required for a light cross 42. When using a light cross 42, a large fraction of the generated light is disadvantageously destroyed by the aperture and can no longer be used. For a shadow cross, a very thin and therefore quite unstable cross structure would have to be introduced into the focal plane of the imaging lens. An advantageous combined solution is an aperture having an L-shaped light transmission and/or having a cover opaque to a quarter of the light transmission for generating an L-shaped light marking 38, as shown FIG. 2. An aperture can thus be easily produced mechanically and attached in the beam path. Relatively little light is destroyed. Additionally, two mutually perpendicular lines are available for the measurement.

The position of the light marking 38 on the roadway 40 is fixedly coupled to the orientation of the matrix-beam light segments by constructive measures inside the headlight 36.

Two principles are particularly useful for detecting the light marking 38. According to the first principle, successive images 51 from the camera 18 are integrated. This takes advantage of the fact that the light marking 38 theoretically remains in the same place in each camera image and stays sharp. The remaining image content is blurred when the vehicle moves due to the movement of the vehicle's surroundings 60 relative to the vehicle 10. According to the second principle, the light marking 38 is modulated at a relatively low frequency.

Figure 3:
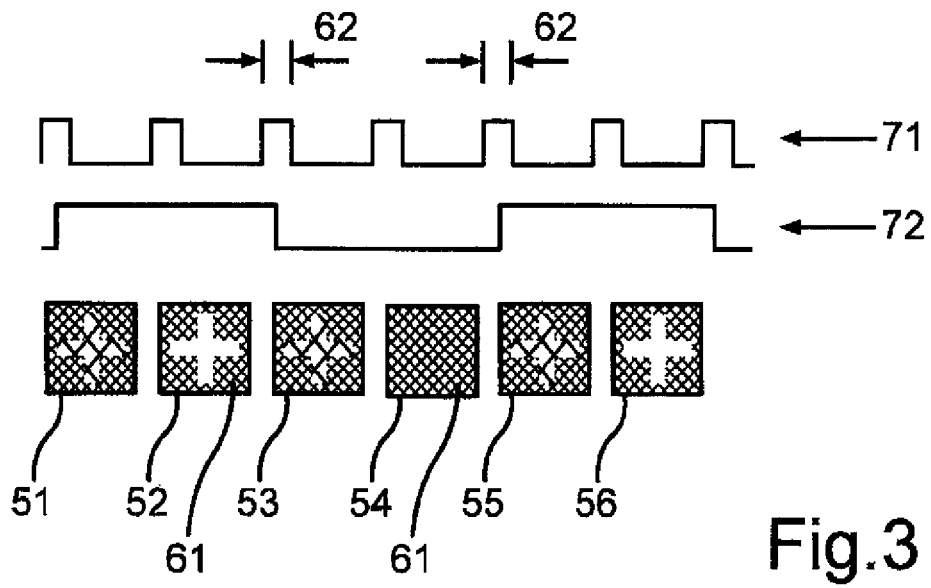
FIG. 3 shows a time sequence of camera exposure and modulation of a light marking.

FIG. 3 shows a possible time sequence of camera exposure and modulation of a light marking. The exposure and evaluation cycle 71 of the camera 18 is illustrated in the upper part of the figure, the switching state 72 of the light marking 38 is illustrated in the center part of the figure, and the resulting camera images 51 to 56 are shown in the lower part of the figure. The object is hereby to obtain an image 52 with a light marking 38 and an image 54 without a light marking 38 within very few camera images 51. Assuming that the scenery 61 is identical in both images 52, 54, the light marking 38 can be computed (i.e. highlighted or isolated) by forming the difference between the two images 52, 54. The latter method has produced slightly better results in preliminary tests than the earlier-mentioned method and will now be explained in more detail.

In the following, an advantageous selection of the modulation frequency will be explained. In the illustrated example, the light marking 38 is active in the first 51 and the third 53 camera image only during half of the exposure time 62. These images 51, 53 must be discarded. Conversely, the difference image from the second 52 and the fourth 54 camera image produces a clean image of the light marking 38. Here, a modulation frequency is used which corresponds to half the camera frequency. The frequency may be further reduced, with the advantage that then a series of consecutive images are created in which the light marking 38 is fully activated or deactivated. The noise can be minimized through averaging. Disadvantageously, however, the likelihood increases that the scenery 61 changes, so that the earlier assumption does not apply, thereby impairing the result the difference formation.

First experiences have shown that an oncoming road user barely perceives the low-frequency modulated light during an encounter. When it turns out that other road users are irritated the light marking 38, the light marking 38 may be generated only when the camera 18 does not detect another road user within the surrounding area, and the image of a previously detected light marking 38 is used for determining the light-marking-related target illumination.

The camera 18 detects the light markings 38. A precise compensation of a horizontal and vertical deviation of the orientation of the headlight is readily possible due to the small distance 64 between the vehicle 10 and light marking 38.

When a light marking 38 is generated for each of two or more headlights 36, and when images of the light markings 38 for the other headlights 36 are also taken into account when considering the captured image of the light marking 38, the images of the recorded light markings 38 can advantageously be used by relying on trigonometric relationships, for example to determine a relative position of the light markings 38 to each other, or a relative position of a light marking 38 to the camera 18. Corresponding advantages can be achieved with a camera system 18 (for example with a stereo camera) having a plurality of recording channels that are arranged or oriented differently in space.

Figure 4:
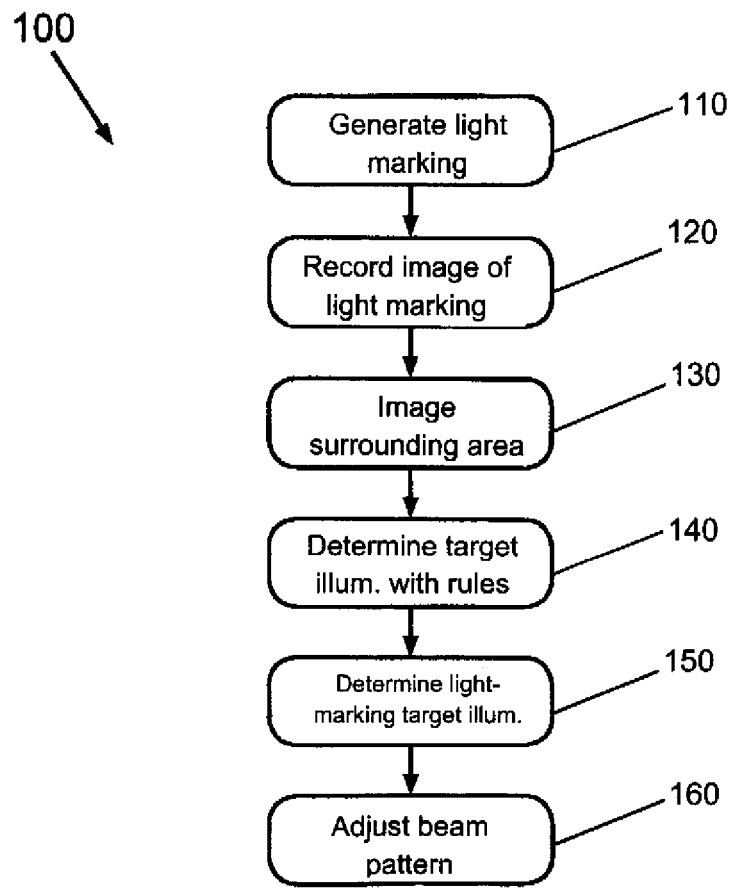
FIG. 4 shows a schematic flow diagram of a method for compensating misalignment of a headlight for a vehicle.

FIG. 4 shows the process flow of a method 100 for compensating for misalignment of a headlight 36 for a vehicle 10, wherein the headlight 36 is configured to produce light having different beam patterns. In a first step 110, a light marking 38 on an object 40 located outside of the vehicle 10 is generated with the headlight 36. In a second step 120, an image of the light marking 38 is recorded by a camera 18. In a third step 130, an image of the surrounding area is taken using the same camera 18. In a fourth step 140, a target illumination related to an image of the surrounding area is determined by taking into account illumination rules. In a fifth step 150, a light-marking-related target illumination is determined using the determined target illumination related to an image of the surrounding area and of the recorded image of the light marking 38. In a sixth step 160, a beam pattern of the headlight 36 is adjusted by taking into account the light-marking-related target illumination.

Alternatively or in addition to the above-described method 100 for compensating misalignment of a headlight 36, a misalignment of the headlight 36 can be determined, i.e. a position of the headlight can be calibrated, by comparing the detected actual position of the recorded light marking 38 with a previously determined target position of the recorded light markings 38 via a fixed relationship of the headlight 36 (for example, of the matrix-beam light segments) relative to the light marking 38.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for compensating for misalignment of a headlight for a vehicle, wherein the headlight generates light having different beam patterns, the method comprising:
    generating with the headlight a light marking on an object located outside the vehicle, wherein the light marking is generated in a region that is located in front of, next to or behind the vehicle and is spatially located between a visibility limit of a camera and a visibility limit of a driver;
    recording an image of the light marking with a camera;
    recording an image of a surrounding area with the same camera;
    determining a target illumination related to an image of the surrounding area, by taking into consideration illumination rules;
    determining a light-marking-related target illumination by taking into consideration the determined target illumination related to the image of the surrounding area and the recorded image of the light marking; and
    adjusting a beam pattern of the headlight by taking into consideration the light-marking-related target illumination.

2. The method of claim 1, wherein the image of the light marking is recorded before or after, or both, the image of the surrounding area is recorded.

3. The method of claim 1, wherein the image of the light marking is recorded at the same time as the image of the surrounding area is recorded.

4. The method of claim 1, wherein a wavelength of light generating the light marking has a wavelength between 380 nm and 780 nm.

5. The method of claim 1, wherein light of the light marking has at least one of a feature selected from a frequency range, a modulation frequency and an amplitude that is imperceptible to a human eye.

6. The method of claim 1, wherein the light marking has an angular shape or an L-shape.

7. The method of claim 1, wherein the image of the light marking is generated from a plurality of recordings of the light marking.

8. The method of claim 1, wherein the different beam patterns of the headlight are each adjusted by electronically or mechanically adjusting a radiation pattern of the headlight.

9. A headlight system for a vehicle, comprising:
    headlight generating light with an adjustable beam pattern;
    a camera,
    wherein the headlight system is configured to
        generate with the headlight a light marking on an object located outside the vehicle, wherein the light marking is generated in a region that is located in front of, next to or behind the vehicle and is spatially located between a visibility limit of the camera and a visibility limit of a driver;
        record an image of the light marking with the camera;
        record an image of a surrounding area with the same camera;
        determining a target illumination related to an image of the surrounding area, by taking into consideration illumination rules;
        determine a light-marking-related target illumination by taking into consideration the determined target illumination related to the image of the surrounding area and the recorded image of the light marking; and
        adjust the beam pattern of the headlight by taking into consideration the light-marking-related target illumination.

* * * * *